(12) United States Patent
McLendon et al.

(10) Patent No.: US 6,268,570 B1
(45) Date of Patent: Jul. 31, 2001

(54) METHOD FOR CORRECTING WEIGHT MEASUREMENT ERRORS DURING MICROWAVE HEATING

(75) Inventors: Byron E. McLendon, Matthews; Edward Earl King, Charlotte, both of NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 09/398,130

(22) Filed: Sep. 17, 1999

(51) Int. Cl.$^7$ .............................. G01G 9/00; G01N 25/00; G01N 5/02
(52) U.S. Cl. ..................... 177/1; 177/25.13; 177/245; 73/76; 374/14
(58) Field of Search ................ 177/25.13, 25.14, 177/50, 245, 1; 73/1.13, 76; 702/101; 374/14

(56) References Cited

U.S. PATENT DOCUMENTS

| | | | |
|---|---|---|---|
| 3,973,636 | * 8/1976 | Uchida | 177/132 |
| 4,106,329 | 8/1978 | Takahashi et al. | 73/1.15 |
| 4,291,775 | 9/1981 | Collins | 177/1 |
| 4,438,500 | 3/1984 | Collins et al. | 374/14 |
| 4,457,632 | 7/1984 | Collins et al. | 374/14 |
| 4,554,132 | 11/1985 | Collins | 422/68 |
| 4,566,312 | 1/1986 | Collins et al. | 374/14 |
| 4,651,285 | 3/1987 | Collins et al. | 374/14 |
| 4,681,996 | 7/1987 | Collins et al. | 374/14 |
| 4,750,143 | * 6/1988 | Heitz et al. | 177/25.13 X |
| 4,753,889 | 6/1988 | Collins | 436/23 |
| 4,838,705 | * 6/1989 | Byers, Jr. et al. | 374/14 |
| 5,055,262 | * 10/1991 | Czarnecki | 374/14 X |
| 5,318,049 | 6/1994 | Henderson et al. | 131/290 |
| 5,625,170 | * 4/1997 | Poris | 177/50 |
| 5,801,337 | * 9/1998 | Peake | 177/1 |

FOREIGN PATENT DOCUMENTS

WO 97/10482  3/1997  (WO).

* cited by examiner

*Primary Examiner*—Randy W. Gibson
(74) *Attorney, Agent, or Firm*—Philip Summa, P.A.

(57) ABSTRACT

The invention is a method of measuring an apparent weight of a substance, while concurrently measuring a surface temperature of the substance and an ambient air temperature surrounding the substance, then predicting buoyancy forces acting upon the substance based on these temperature measurements. Thereafter, the true weight of the substance can be determined by correcting the apparent weight by the predicted buoyancy forces acting upon the substance.

16 Claims, 5 Drawing Sheets

FIG. 5.
Pressure Effects

METHOD FOR CORRECTING WEIGHT MEASUREMENT ERRORS DURING MICROWAVE HEATING

This application is related to co-pending and commonly assigned applications Ser. No. 09/397,825 (Microwave Volatiles Analyzer with High Efficiency Cavity) and Ser. No. 09/397,825 ((Microwave Apparatus and Method for Achieving Accurate Weight Measurements), both of which are filed concurrently with this application.

FIELD OF THE INVENTION

The invention relates to methods of measuring the weight of sample materials before, during, and after heating. In particular, the invention is directed toward improving the accuracy of weight measurements by adjusting apparent weight to true weight by considering weight bias caused by air density gradients.

BACKGROUND OF THE INVENTION

The determination of sample solids fraction or sample moisture content is a routine laboratory determination. Many agricultural products, food products, and manufactured products (e.g., textiles, films, coatings, paper, and paints) are sold based on solids content or moisture content. Consequently, solids and moisture analyses are frequently run. Unfortunately, monitoring moisture and solids content using conventional techniques is exceedingly time consuming. For example, drying a sample in a convection oven to achieve solids content takes upwards of four hours and typically requires desiccation of the dried sample.

There are, however, high-speed analytical procedures for volatilizing moisture or solvents to facilitate quantitative analysis of various substances (e.g., agricultural commodities, foodstuffs, dairy products, chemicals, paper products, and tobacco). These procedures often employ microwave energy to heat a material sample to remove various volatiles. Thereafter, moisture, solids, or other residuals and losses can be determined. To achieve these weight measurements rapidly and accurately, the sample is not removed from the balance, but rather weighed in place after each succeeding step. Such automation reduces the possibility of human error.

The weight of the substance is often sensed or measured repeatedly during the microwave heating while volatiles are being removed from the heated sample. Consequently, such methods not only require sensitive analytical balances, but the capability to measure weight while the sample is hot. These methods, however, fail to correct weight measurements for the buoyancy effects that are caused by temperature and pressure variances within the microwave cavity. This failure can introduce significant errors to determinations of solids or moisture content.

U.S. Pat. No. 4,753,889 (hereinafter the Collins '889 patent), which is commonly assigned with this application, is directed to rapid quantitative analyses of materials having high moisture content. The Collins '889 patent discloses the evaporation of moisture to determine the solids and other materials present without removing or destroying the other materials when removing moisture. In particular, rapid analysis is facilitated by microwave heating to drive off moisture, followed by solvent extraction, and content determinations. U.S. Pat. No. 4,753,889 is hereby entirely incorporated by reference.

Similarly, U.S. Pat. No. 4,291,775 (hereinafter the Collins '775 patent), which is commonly assigned with this application, addresses the problem of disruptive convection currents. More specifically, the Collins '775 patent describes a method and apparatus for improving the weighing accuracy of sensitive automatic balances when weighing heated substances by introducing an air barrier shield to cover the balance plate without contacting or touching the automatic balance. This tends to reduce the convection currents that can interfere with the sensitive balance and, consequently, hinder the achievement of accurate sample weight measurements. In other words, the eliminating convection air currents reduces movement of the balance and thereby fluctuations in the measurement of sample weight being sensed. U.S. Pat. No. 4,291,775 is hereby entirely incorporated by reference.

Finally, U.S. patent application Ser. No. 09/397,825 (Microwave Apparatus and Method for Achieving Accurate Weight Measurements), which is commonly assigned with this application, improves upon the teachings of the Collins '775 patent by including an air shield that is removably secured to the inside of the heating cavity such that the air shield does not contact an analytical balance when the air shield is fastened to the heating cavity. By securing the air shield to the interior of the microwave cavity, a laboratory technician or instrument operator need not manipulate a movable barrier that must rest on the cavity floor, yet be placed so that the barrier substantially surrounds both the analytical balance and the sample to be heated. U.S. patent application Ser. No. 09/397,825 (Microwave Apparatus and Method for Achieving Accurate Weight Measurements) is likewise entirely incorporated by reference.

While these methods overcome specific problems associated with microwave heating and drying, none discloses nor teaches a method for correcting apparent sample weight to account for buoyancy effects caused by different air densities surrounding a sample. Therefore, there is a need for a method to correct weight measurements for the buoyancy effects that are caused by temperature and pressure variances within a heating environment.

OBJECT AND SUMMARY OF THE INVENTION

Therefore, it is an object of this invention to provide a method for adjusting measured, apparent sample weight to account for buoyancy effects that occur during microwave heating in order to achieve more accurate sample weight measurements.

It is a further object of the invention to provide a method for accurately determining solid fraction of a sample by correcting weight measurements to account for lift effects that occur during heating.

The invention achieves this, in part, by measuring the surface temperature of a sample pad and the ambient air temperature surrounding the sample pad, and thereafter calculating the buoyancy of the sample pad caused by this temperature variance.

The foregoing, as well as other objectives and advantages of the invention and the manner in which the same are accomplished, is further specified within the following detailed description and its accompanying drawings.

DETAILED DESCRIPTION OF THE INVENTION

The present invention is a method of achieving an accurate sample weight by correcting for buoyancy effects. These buoyancy effects are caused by air density gradients, which create differential air pressures acting on a sample pad.

In its broadest aspects, the method includes measuring an apparent weight of a substance, typically a lightweight sample pad, while concurrently measuring a surface temperature of the substance and an ambient air temperature surrounding the substance, then predicting buoyancy forces acting upon the substance based on these temperature measurements. Thereafter, the true weight of the substance is determined by correcting the apparent weight by the predicted buoyancy forces acting upon the substance.

It will be understood by those having ordinary skill in the art that to complete the prediction of buoyancy forces acting upon a substance, the projected surface area of the substance must be known. As used herein, projected surface area is defined by the projection of the sample onto a horizontal plane. For example, the projected surface area of a flat, horizontal surface is simply the surface area. In contrast, a three-dimensional object, such as a ball, would have a two-dimensional projected surface area, such as a circle.

Typically, a lightweight sample pad having an essentially planar upper and lower surface, as well as an established projected surface area, will be used such that the surface area of the substance is effectively constant. In this regard, sample pads available from CEM Corporation, Stallings, North Carolina, have been found to be especially effective. The preferred CEM sample pads have a surface area (and a projected surface area) of 98 square centimeters (i.e., 3.8 inches by 4.0 inches).

In one preferred embodiment, weight measurements are performed using an analytical balance. In another preferred embodiment, the surface temperature of the substance is measured using infrared radiation. Techniques for using analytical balances and infrared radiation devices are well known in the art and will not be further discussed herein.

Most preferably, the method is practiced using a microwave apparatus. Consequently, in yet another embodiment, the ambient air temperature surrounding the substance is simply the ambient air temperature within a microwave cavity. When a microwave apparatus is employed, the microwave cavity may include a heatable cavity floor that is designed to control the ambient air temperature within the microwave cavity. (Heatable cavity floors are sometimes employed to reduce condensation within the microwave cavity.) In this arrangement, the ambient air temperature of the microwave cavity is preferably predicted based on the measured temperature of a heatable microwave cavity floor.

The present method of correcting for buoyancy effects has been found to be particularly applicable when using a high-speed microwave apparatus to determine sample solids fraction or sample moisture content. Unlike conventional convection heating techniques, which can take upwards of four hours, or even infrared heating techniques, which require between 10 and 20 minutes, a well-designed microwave system can ascertain the solids fraction of a sample within about two minutes.

As will be understood by those having ordinary skill the art, materials such as agricultural, food, and textile products are often hygroscopic when hot and dry. Consequently, if such dried materials are permitted to reabsorb water before a final weight is measured, the solids fraction determination will be erroneous. Thus, after drying, conventional drying techniques must first bring a hot material sample to temperature equilibrium in a moisture-free environment. Most commonly, this demands that the material sample be cooled in a desiccator. In contrast, the present method is capable of obtaining a final sample weight immediately upon the conclusion of drying. Therefore, there is no need for a time-consuming desiccation step.

In one broad aspect, the method of accurately determining the solid fraction of a material sample using a microwave apparatus requires that a true weight of a material sample be determined by correcting a measured weight of the material sample before drying to account for buoyancy effects. In such embodiments, microwave energy introduced into the microwave cavity dries the material sample within a few minutes. Thereafter, the true weight of the material sample after drying can be determined to account for buoyancy effects. As will be understood by those having ordinary skill the art, the solids fraction of the material sample is calculated by dividing the true weight material sample after drying by the true weight of the material sample before drying.

Accordingly, in this aspect of the invention, the method includes using an analytical balance to measure an apparent weight of a sample pad that is positioned within the microwave cavity while, at the same time, measuring an initial surface temperature of a sample pad and initial ambient air temperature of the microwave cavity. As discussed previously, buoyancy forces acting upon the sample pad may then be derived from the initial surface temperature of the sample pad and the initial ambient air temperature of the microwave cavity. A true weight of the sample pad can then be determined by correcting the initial apparent weight of the sample pad by the predicted buoyancy forces acting upon the sample pad.

Once a true weight of the sample pad is established, a material sample for which solids fraction is desired is placed on the sample pad. Then, the apparent combined weight of both the sample pad and material sample is measured while a subsequent surface temperature of the sample pad and a subsequent ambient air temperature of the microwave cavity are concurrently measured. Based on the subsequent temperatures of the sample pad and the ambient air temperature within the microwave cavity, the buoyancy forces acting upon the sample pad and material sample can be predicted.

A true combined weight of the sample pad and the material sample can then be determined by correcting the apparent combined weight of the sample pad and the material sample by the predicted buoyancy forces acting on the sample pad and the material sample. Finally, as will be understood by those having ordinary skill the art, the true weight of the material sample before drying is easily calculated by subtracting the true weight of the sample pad from the true combined weight of the sample pad and material sample.

Next, heat energy, preferably microwave radiation, is applied to the material sample. This removes moisture from the material sample. Then, the apparent combined weight of the sample pad and the dried material sample is measured with the analytical balance while, at the same time, a final surface temperature of the sample pad and a final ambient air temperature of the microwave cavity are measured. As disclosed earlier, the buoyancy forces acting upon the sample pad and the dried material sample are predicted based on the final surface temperature of the sample pad and the final air temperature of the microwave cavity.

Thereafter, the true combined weight of the sample pad and the dried material sample is achieved by correcting the apparent combined weight of the sample pad and the dried material sample by the predicted buoyancy forces acting upon the sample pad and the dried material sample. Furthermore, the true weight of the dried material sample is easily calculated by subtracting the true weight of the sample pad from the true weight of the sample pad and the dried material sample. As will be recognized by those having ordinary skill in the art, the solids fraction of the material sample is further calculated by dividing the true weight of the material sample after drying (i.e., the dried material sample) by the true weight of the material sample before drying.

It should be emphasized that by employing a microwave apparatus, this method of determining solids fraction of a material sample can be completed in less than about two minutes. Moreover, because the material sample is weighed before it cools, the material sample does not reabsorb moisture, such as that which can condense within the microwave cavity Without wishing to be bound to any particular theory, the inventors of the present method believe buoyancy effects occur when temperature gradients exist near the sample pad. This is, of course, to be expected during sample heating operations, especially when a high-speed microwave apparatus is employed. More specifically, temperature gradients cause the density of air to vary around the sample pad for air density is inversely proportional to temperature. Consequently, to the extent the air pressure below the pad is greater than the air pressure above the pad, the sample pad can become somewhat buoyant.

As will be understood by those having skill in fluid mechanics and heat transfer, this kind of air pressure differential creates an upward lift upon the sample pad, thereby causing the analytical balance to record a low weight measurement for the sample pad. This buoyancy concept is explained further by Incropera and Dewitt, in *Fundamentals of Heat Transfer* (John Wiley & Sons 1981), which is entirely incorporated herein by reference. It should be further understood that although a preferred embodiment of the invention employs a microwave cavity, the invention is not so limited.

Figure 1:
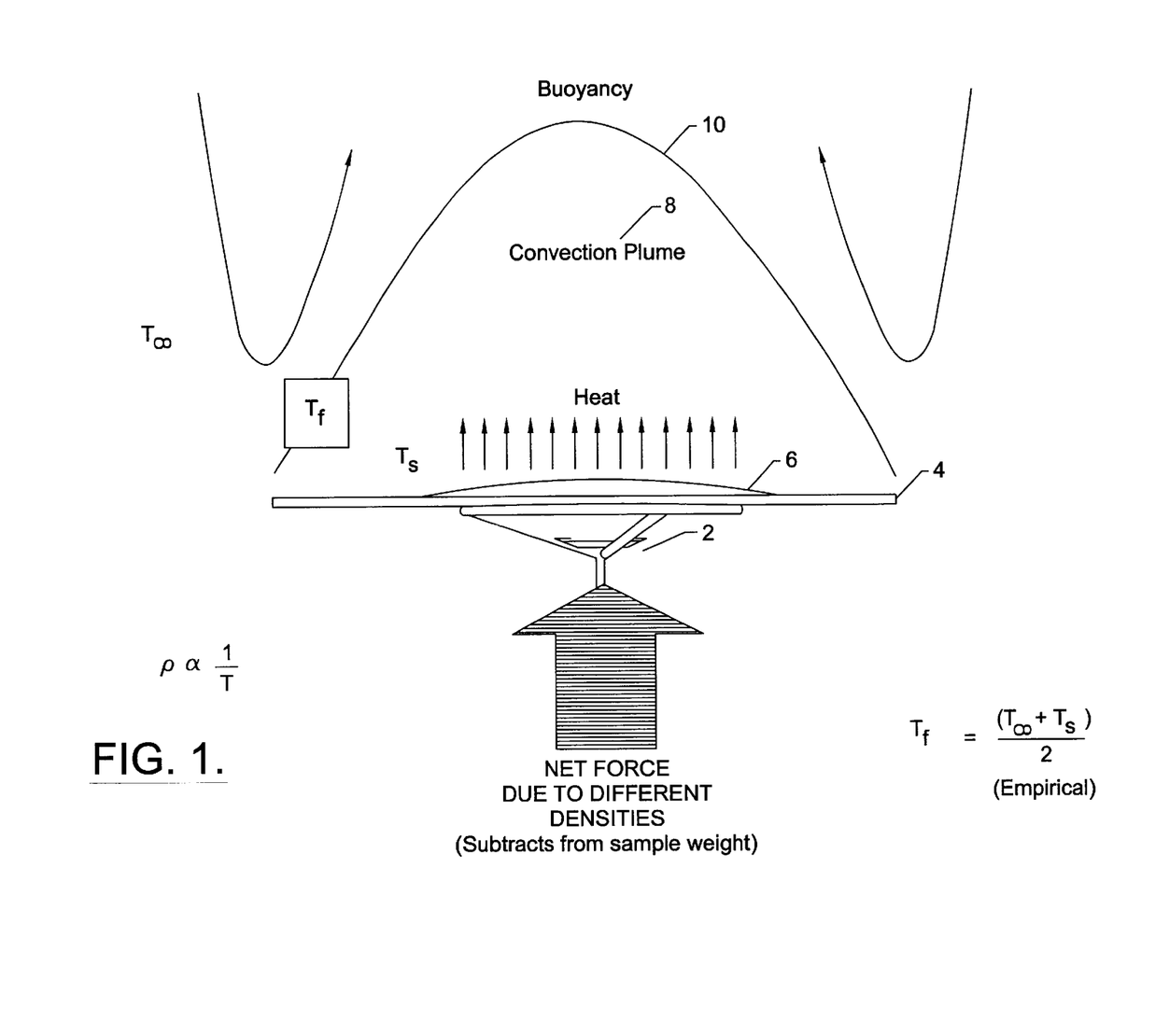
FIG. 1 depicts a schematic of the buoyancy effect with respect to a sample resting on an analytical balance stem.

This buoyancy phenomenon may be better understood in the context of sample heating by referring to FIG. 1, which graphically illustrates the effect of temperature gradients upon the sample pad. In brief, analytical balance stem 2, which is connected to an analytical balance (not shown) supports sample pad 4, which further supports heated material sample 6. Temperature $T_s$ at the surface of sample pad 4 is greater than temperature $T_\infty$, the ambient temperature surrounding the sample pad. The surface of sample pad 4 creates a convection plume 8 extending from the surface of the sample pad to a film layer 10. Within convection plume 8, there is a decreasing temperature gradient from sample pad surface 4 to film layer boundary 10. The ambient air temperature $T_\infty$ outside the convection plume is typically cooler than the temperature $T_f$ at film layer 10. It is worth noting that if the ambient air is warmer than the sample pad, the sample pad will effectively sink.

Temperature $T_f$ at the film layer 10 is determined empirically by averaging the surface temperature of sample pad 4 and the ambient air temperature $T_\infty$ otherwise surrounding sample pad 4 (i.e., $(T_s+T_\infty)\div 2$). It is the density of air at film layer 10 that is compared to the density of the ambient air otherwise surrounding the sample pad to determine the net force on the sample pad. In the examples that follow, the density refers to the air density at the film layer.

In particular, the density of the film layer air ($\rho f$) and the density of the ambient air ($\rho\infty$) is calculated according to the following formula:

$$\rho = P \div (R \cdot T),$$

wherein
 $\rho$=air density (mg/cm$^3$),
 P=air pressure, (N/m$^2$),
 R=gas constant for air (287.1 J/kg K,), and
 T=temperature (K)

Thereafter, the respective forces exerted upon the top of the pad ($F_f$) and bottom the pad ($F_\infty$) can be calculated according to the following formula:

$$F = \rho \cdot g \cdot h \cdot A,$$

wherein
 F=force exerted on one side of the sample pad
 $\rho$=density (mg/cm$^3$)
 g=gravitational acceleration
 h=height of fluid column above sample pad
 A=projected surface area of pad (cm$^2$)

It should be noted that, as a practical matter, the difference in height of the fluid column above and below a thin pad could be neglected. Similarly, for convenience, the gravitational acceleration can be omitted to yield the buoyancy lift in terms of mass units. It should be understood that the difference between mass and weight is not lost on the inventors. The interchangeable use of mass and weight is merely convenient when dealing with laboratory balances calibrated in a uniform gravitational field.

Accordingly, in one aspect the invention facilitates the calculation of buoyancy forces as a function of the surface area of the substance, the surface temperature of the substance, and the ambient air temperature surrounding the substance using the following equation:

$$\text{Buoyant Lift (mg)} = [(P \cdot A) \div R] \cdot [(1 \div T_\infty) - (2 \div (T_\infty + T_s))],$$

wherein
 P=barometric pressure, (N/m$^2$),
 A=projected surface area of the substance (cm$^2$),
 R=gas constant for air (287.1 J/(kg K)),
 $T_\infty$=absolute ambient air temperature (K), and
 $T_s$=absolute surface temperature (K).

As noted previously, the substance is typically a lightweight sample pad that is designed to support a material sample.

Example 1 discloses calculated buoyancy lift data as a result of a temperature variance between the upper surface of CEM Corporation's standard 98 cm² sample pad (3.85"× 4.0") and the ambient air otherwise surrounding the sample pad (i.e., $F_\infty - F_f$). In particular, Example 1 assumes that the ambient air has a temperature of 25° C. and a pressure of 101,325 N/m² (i.e., 1 atmosphere).

Figure 2:
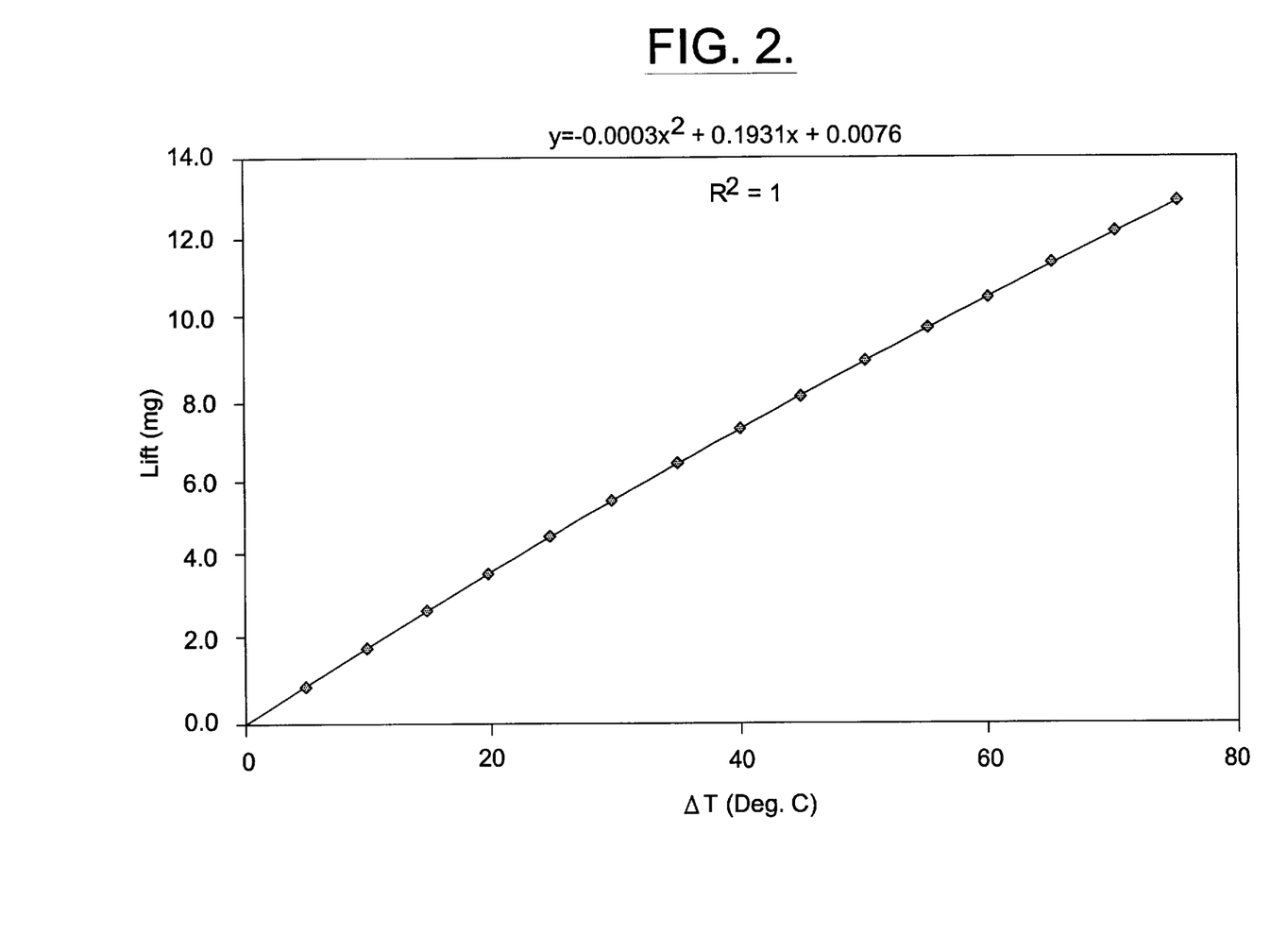
FIG. 2 depicts a buoyancy correlation based on the difference between the surface temperature of a sample pad and the ambient air temperature surrounding the sample pad, wherein the ambient air is at room temperature (25° C.) and standard pressure (1013 millibars).

In this regard, a function correlating lift based on the temperature difference between $T_s$, the temperature at the surface of the sample pad, and $T_\infty$, the ambient air temperature otherwise surrounding the sample pad can be established. As disclosed previously, $T_f$, the temperature at the film layer, is calculated by averaging $T_s$ and $T_\infty$, $(T_s+T_\infty) \div 2$. FIG. 2, which reflects the data and constraints from Example 1, shows the correlation between lift and temperature difference (i.e., $T_s - T_\infty$) at a temperature of 25° C. and a pressure of 1013 millibars (i.e., 101,325 N/m² or 1 atmosphere). This correlation can be expressed as follows:

$$\text{Lift (mg)} = -0.0003(\Delta T)^2 + 0.1931(\Delta T) + 0.0076$$

Like Example 1, Example 2 discloses calculated buoyancy lift data as a result of a temperature variance between the upper surface of CEM Corporation's standard 98 cm² sample pad (3.85"×4.0") and the ambient air otherwise surrounding the sample pad (i.e., $F_\infty - F_f$). Example 2, however, examines lift at an ambient air temperature of 50° C. and a pressure of 1013 millibars (i.e., 1 atmosphere).

| Ts ° C.) | Δ T (top-bottom) (° C.) | Density (film layer) | Lift (mg) $F_\infty - F_1$ |
|---|---|---|---|
| 25 | 0 | 1.183 | 0.0 |
| 26 | 1 | 1.181 | 0.2 |
| 27 | 2 | 1.179 | 0.4 |
| 28 | 3 | 1.178 | 0.6 |
| 29 | 4 | 1.176 | 0.8 |
| 30 | 5 | 1.174 | 1.0 |
| 31 | 6 | 1.172 | 1.2 |
| 32 | 7 | 1.170 | 1.3 |
| 33 | 8 | 1.168 | 1.5 |
| 34 | 9 | 1.166 | 1.7 |
| 35 | 10 | 1.164 | 1.9 |
| 36 | 11 | 1.162 | 2.1 |
| 37 | 12 | 1.160 | 2.3 |
| 38 | 13 | 1.158 | 2.5 |
| 39 | 14 | 1.156 | 2.7 |
| 40 | 15 | 1.154 | 2.8 |
| 41 | 16 | 1.153 | 3.0 |
| 42 | 17 | 1.151 | 3.2 |
| 43 | 18 | 1.149 | 3.4 |
| 44 | 19 | 1.147 | 3.6 |
| 45 | 20 | 1.145 | 3.8 |
| 46 | 21 | 1.143 | 3.9 |
| 47 | 22 | 1.141 | 4.1 |
| 48 | 23 | 1.139 | 4.3 |
| 49 | 24 | 1.138 | 4.5 |
| 50 | 25 | 1.136 | 4.7 |
| 51 | 26 | 1.134 | 4.8 |
| 52 | 27 | 1.132 | 5.0 |
| 53 | 28 | 1.130 | 5.2 |
| 54 | 29 | 1.129 | 5.4 |
| 55 | 30 | 1.127 | 5.6 |
| 56 | 31 | 1.125 | 5.7 |
| 57 | 32 | 1.123 | 5.9 |
| 58 | 33 | 1.121 | 6.1 |
| 59 | 34 | 1.120 | 6.3 |
| 60 | 35 | 1.118 | 6.4 |
| 61 | 36 | 1.116 | 6.6 |
| 62 | 37 | 1.114 | 6.8 |
| 63 | 38 | 1.113 | 7.0 |
| 64 | 39 | 1.111 | 7.1 |
| 65 | 40 | 1.109 | 7.3 |
| 66 | 41 | 1.107 | 7.5 |
| 67 | 42 | 1.106 | 7.6 |
| 68 | 43 | 1.104 | 7.8 |
| 69 | 44 | 1.102 | 8.0 |
| 70 | 45 | 1.100 | 8.1 |
| 71 | 46 | 1.099 | 8.3 |
| 72 | 47 | 1.097 | 8.5 |
| 73 | 48 | 1.095 | 8.6 |
| 74 | 49 | 1.094 | 8.8 |
| 75 | 50 | 1.092 | 9.0 |
| 76 | 51 | 1.090 | 9.1 |
| 77 | 52 | 1.089 | 9.3 |
| 78 | 53 | 1.087 | 9.5 |
| 79 | 54 | 1.085 | 9.6 |
| 80 | 55 | 1.083 | 9.8 |
| 81 | 56 | 1.082 | 10.0 |
| 82 | 57 | 1.080 | 10.1 |
| 83 | 58 | 1.079 | 10.3 |
| 84 | 59 | 1.077 | 10.4 |
| 85 | 60 | 1.075 | 10.6 |
| 86 | 61 | 1.074 | 10.8 |
| 87 | 62 | 1.072 | 10.9 |
| 88 | 63 | 1.070 | 11.1 |
| 89 | 64 | 1.069 | 11.2 |
| 90 | 65 | 1.067 | 11.4 |
| 91 | 66 | 1.065 | 11.6 |
| 92 | 67 | 1.064 | 11.7 |
| 93 | 68 | 1.062 | 11.9 |
| 94 | 69 | 1.061 | 12.0 |
| 95 | 70 | 1.059 | 12.2 |
| 95 | 71 | 1.058 | 12.3 |
| 97 | 72 | 1.056 | 12.5 |
| 98 | 73 | 1.054 | 12.7 |
| 99 | 74 | 1.053 | 12.8 |
| 100 | 75 | 1.051 | 13.0 |
| 101 | 76 | 1.050 | 13.1 |
| 102 | 77 | 1.048 | 13.3 |
| 103 | 78 | 1.047 | 13.4 |
| 104 | 79 | 1.045 | 13.6 |
| 105 | 80 | 1.043 | 13.7 |
| 106 | 81 | 1.042 | 13.9 |
| 107 | 82 | 1.040 | 14.0 |
| 108 | 83 | 1.039 | 14.2 |
| 109 | 84 | 1.037 | 14.3 |
| 110 | 85 | 1.036 | 14.5 |
| 111 | 86 | 1.034 | 14.6 |
| 112 | 87 | 1.033 | 14.8 |
| 113 | 88 | 1.031 | 14.9 |
| 114 | 89 | 1.030 | 15.1 |
| 115 | 90 | 1.028 | 15.2 |
| 116 | 91 | 1.027 | 15.4 |
| 117 | 92 | 1.025 | 15.5 |
| 118 | 93 | 1.024 | 15.7 |
| 119 | 94 | 1.022 | 15.8 |
| 120 | 95 | 1.021 | 15.9 |
| 121 | 96 | 1.019 | 16.1 |
| 122 | 97 | 1.018 | 16.2 |
| 123 | 98 | 1.016 | 16.4 |
| 124 | 99 | 1.015 | 16.5 |
| 125 | 100 | 1.013 | 16.7 |
| 126 | 101 | 1.012 | 16.8 |
| 127 | 102 | 1.011 | 17.0 |
| 128 | 103 | 1.009 | 17.1 |
| 129 | 104 | 1.008 | 17.2 |
| 130 | 105 | 1.006 | 17.4 |
| 131 | 106 | 1.005 | 17.5 |
| 132 | 107 | 1.003 | 17.7 |
| 133 | 108 | 1.002 | 17.8 |
| 134 | 109 | 1.001 | 17.9 |
| 135 | 110 | 0.999 | 18.1 |
| 136 | 111 | 0.998 | 18.2 |
| 137 | 112 | 0.996 | 18.3 |
| 138 | 113 | 0.995 | 18.5 |

-continued

| Ts ° C. | ΔT (top-bottom) (° C.) | Density (film layer) | Lift (mg) $F_\infty - F_1$ |
|---|---|---|---|
| 139 | 114 | 0.993 | 18.6 |
| 140 | 115 | 0.992 | 18.8 |
| 141 | 116 | 0.991 | 18.9 |
| 142 | 117 | 0.989 | 19.0 |
| 143 | 118 | 0.988 | 19.2 |
| 144 | 119 | 0.987 | 19.3 |
| 145 | 120 | 0.985 | 19.4 |
| 146 | 121 | 0.984 | 19.6 |
| 147 | 122 | 0.982 | 19.7 |
| 148 | 123 | 0.981 | 19.8 |
| 149 | 124 | 0.980 | 20.0 |
| 150 | 125 | 0.978 | 20.1 |
| 151 | 126 | 0.977 | 20.2 |
| 152 | 127 | 0.976 | 20.4 |
| 153 | 128 | 0.974 | 20.5 |
| 154 | 129 | 0.973 | 20.6 |
| 155 | 130 | 0.972 | 20.8 |
| 156 | 131 | 0.970 | 20.9 |
| 157 | 132 | 0.969 | 21.0 |
| 158 | 133 | 0.968 | 21.2 |
| 159 | 134 | 0.966 | 21.3 |
| 160 | 135 | 0.965 | 21.4 |
| 161 | 136 | 0.964 | 21.6 |
| 162 | 137 | 0.962 | 21.7 |
| 163 | 138 | 0.961 | 21.8 |
| 164 | 139 | 0.960 | 21.9 |
| 165 | 140 | 0.958 | 22.1 |
| 166 | 141 | 0.957 | 22.2 |
| 25 | −25 | 1.183 | −4.7 |
| 26 | −24 | 1.181 | −4.5 |
| 27 | −23 | 1.179 | −4.3 |
| 28 | −22 | 1.178 | −4.1 |
| 29 | −21 | 1.176 | −3.9 |
| 30 | −20 | 1.174 | −3.7 |
| 31 | −19 | 1.172 | −3.5 |
| 32 | −18 | 1.170 | −3.3 |
| 33 | −17 | 1.168 | −3.1 |
| 34 | −16 | 1.166 | −2.9 |
| 35 | −15 | 1.164 | −2.8 |
| 36 | −14 | 1.162 | −2.6 |
| 37 | −13 | 1.160 | −2.4 |
| 38 | −12 | 1.158 | −2.2 |
| 39 | −11 | 1.156 | −2.0 |
| 40 | −10 | 1.154 | −1.8 |
| 41 | −9 | 1.153 | −1.6 |
| 42 | −8 | 1.151 | −1.5 |
| 43 | −7 | 1.149 | −1.3 |
| 44 | −6 | 1.147 | −1.1 |
| 45 | −5 | 1.145 | −0.9 |
| 46 | −4 | 1.143 | −0.7 |
| 47 | −3 | 1.141 | −0.5 |
| 48 | −2 | 1.139 | −0.4 |
| 49 | −1 | 1.138 | −0.2 |
| 50 | 0 | 1.136 | 0.0 |
| 51 | 1 | 1.134 | 0.2 |
| 52 | 2 | 1.132 | 0.4 |
| 53 | 3 | 1.130 | 0.5 |
| 54 | 4 | 1.129 | 0.7 |
| 55 | 5 | 1.127 | 0.9 |
| 56 | 6 | 1.125 | 1.1 |
| 57 | 7 | 1.123 | 1.2 |
| 58 | 8 | 1.121 | 1.4 |
| 59 | 9 | 1.120 | 1.6 |
| 60 | 10 | 1.118 | 1.8 |
| 61 | 11 | 1.116 | 1.9 |
| 62 | 12 | 1.114 | 2.1 |
| 63 | 13 | 1.113 | 2.3 |
| 64 | 14 | 1.111 | 2.5 |
| 65 | 15 | 1.109 | 2.6 |
| 66 | 16 | 1.107 | 2.8 |
| 67 | 17 | 1.106 | 3.0 |
| 68 | 18 | 1.104 | 3.1 |
| 69 | 19 | 1.102 | 3.3 |
| 70 | 20 | 1.100 | 3.5 |
| 71 | 21 | 1.099 | 3.6 |
| 72 | 22 | 1.097 | 3.8 |
| 73 | 23 | 1.095 | 4.0 |
| 74 | 24 | 1.094 | 4.1 |
| 75 | 25 | 1.092 | 4.3 |
| 76 | 26 | 1.090 | 4.5 |
| 77 | 27 | 1.089 | 4.6 |
| 78 | 28 | 1.087 | 4.8 |
| 79 | 29 | 1.085 | 5.0 |
| 80 | 30 | 1.083 | 5.1 |
| 81 | 31 | 1.082 | 5.3 |
| 82 | 32 | 1.080 | 5.5 |
| 83 | 33 | 1.079 | 5.6 |
| 84 | 34 | 1.077 | 5.8 |
| 85 | 35 | 1.075 | 5.9 |
| 86 | 36 | 1.074 | 6.1 |
| 87 | 37 | 1.072 | 6.3 |
| 88 | 38 | 1.070 | 6.4 |
| 89 | 39 | 1.069 | 6.6 |
| 90 | 40 | 1.067 | 6.7 |
| 91 | 41 | 1.065 | 6.9 |
| 92 | 42 | 1.064 | 7.1 |
| 93 | 43 | 1.062 | 7.2 |
| 94 | 44 | 1.061 | 7.4 |
| 95 | 45 | 1.059 | 7.5 |
| 95 | 46 | 1.058 | 7.7 |
| 97 | 47 | 1.056 | 7.8 |
| 98 | 48 | 1.054 | 8.0 |
| 99 | 49 | 1.053 | 8.1 |
| 100 | 50 | 1.051 | 8.3 |
| 101 | 51 | 1.050 | 8.4 |
| 102 | 52 | 1.048 | 8.6 |
| 103 | 53 | 1.047 | 8.8 |
| 104 | 54 | 1.045 | 8.9 |
| 105 | 55 | 1.043 | 9.1 |
| 106 | 56 | 1.042 | 9.2 |
| 107 | 57 | 1.040 | 9.4 |
| 108 | 58 | 1.039 | 9.5 |
| 109 | 59 | 1.037 | 9.7 |
| 110 | 60 | 1.036 | 9.8 |
| 111 | 61 | 1.034 | 10.0 |
| 112 | 62 | 1.033 | 10.1 |
| 113 | 63 | 1.031 | 10.3 |
| 114 | 64 | 1.030 | 10.4 |
| 115 | 65 | 1.028 | 10.5 |
| 116 | 66 | 1.027 | 10.7 |
| 117 | 67 | 1.025 | 10.8 |
| 118 | 68 | 1.024 | 11.0 |
| 119 | 69 | 1.022 | 11.1 |
| 120 | 70 | 1.021 | 11.3 |
| 121 | 71 | 1.019 | 11.4 |
| 122 | 72 | 1.018 | 11.6 |
| 123 | 73 | 1.016 | 11.7 |
| 124 | 74 | 1.015 | 11.9 |
| 125 | 75 | 1.013 | 12.0 |
| 126 | 76 | 1.012 | 12.1 |
| 127 | 77 | 1.011 | 12.3 |
| 128 | 78 | 1.009 | 12.4 |
| 129 | 79 | 1.008 | 12.6 |
| 130 | 80 | 1.006 | 12.7 |
| 131 | 81 | 1.005 | 12.8 |
| 132 | 82 | 1.003 | 13.0 |
| 133 | 83 | 1.002 | 13.1 |
| 134 | 84 | 1.001 | 13.3 |
| 135 | 85 | 0.999 | 13.4 |
| 136 | 86 | 0.998 | 13.5 |
| 137 | 87 | 0.996 | 13.7 |
| 138 | 88 | 0.995 | 13.8 |
| 139 | 89 | 0.993 | 14.0 |
| 140 | 90 | 0.992 | 14.1 |
| 141 | 91 | 0.991 | 14.2 |
| 142 | 92 | 0.989 | 14.4 |
| 143 | 93 | 0.988 | 14.5 |
| 144 | 94 | 0.987 | 14.6 |
| 145 | 95 | 0.985 | 14.8 |
| 146 | 96 | 0.984 | 14.9 |

-continued

| Ts °C. | ΔT (top-bottom) (° C.) | Density (film layer) | Lift (mg) $F_\infty - F_1$ |
|---|---|---|---|
| 147 | 97 | 0.982 | 15.0 |
| 148 | 98 | 0.981 | 15.2 |
| 149 | 99 | 0.980 | 15.3 |
| 150 | 100 | 0.978 | 15.4 |
| 151 | 101 | 0.977 | 15.6 |
| 152 | 102 | 0.976 | 15.7 |
| 153 | 103 | 0.974 | 15.8 |
| 154 | 104 | 0.973 | 16.0 |
| 155 | 105 | 0.972 | 16.1 |
| 156 | 106 | 0.970 | 16.2 |
| 157 | 107 | 0.969 | 16.4 |
| 158 | 108 | 0.968 | 16.5 |
| 159 | 109 | 0.966 | 16.6 |
| 160 | 110 | 0.965 | 16.8 |
| 161 | 111 | 0.964 | 16.9 |
| 162 | 112 | 0.962 | 17.0 |
| 163 | 113 | 0.961 | 17.1 |
| 164 | 114 | 0.960 | 17.3 |
| 165 | 115 | 0.958 | 17.4 |
| 166 | 116 | 0.957 | 17.5 |

Figure 3:
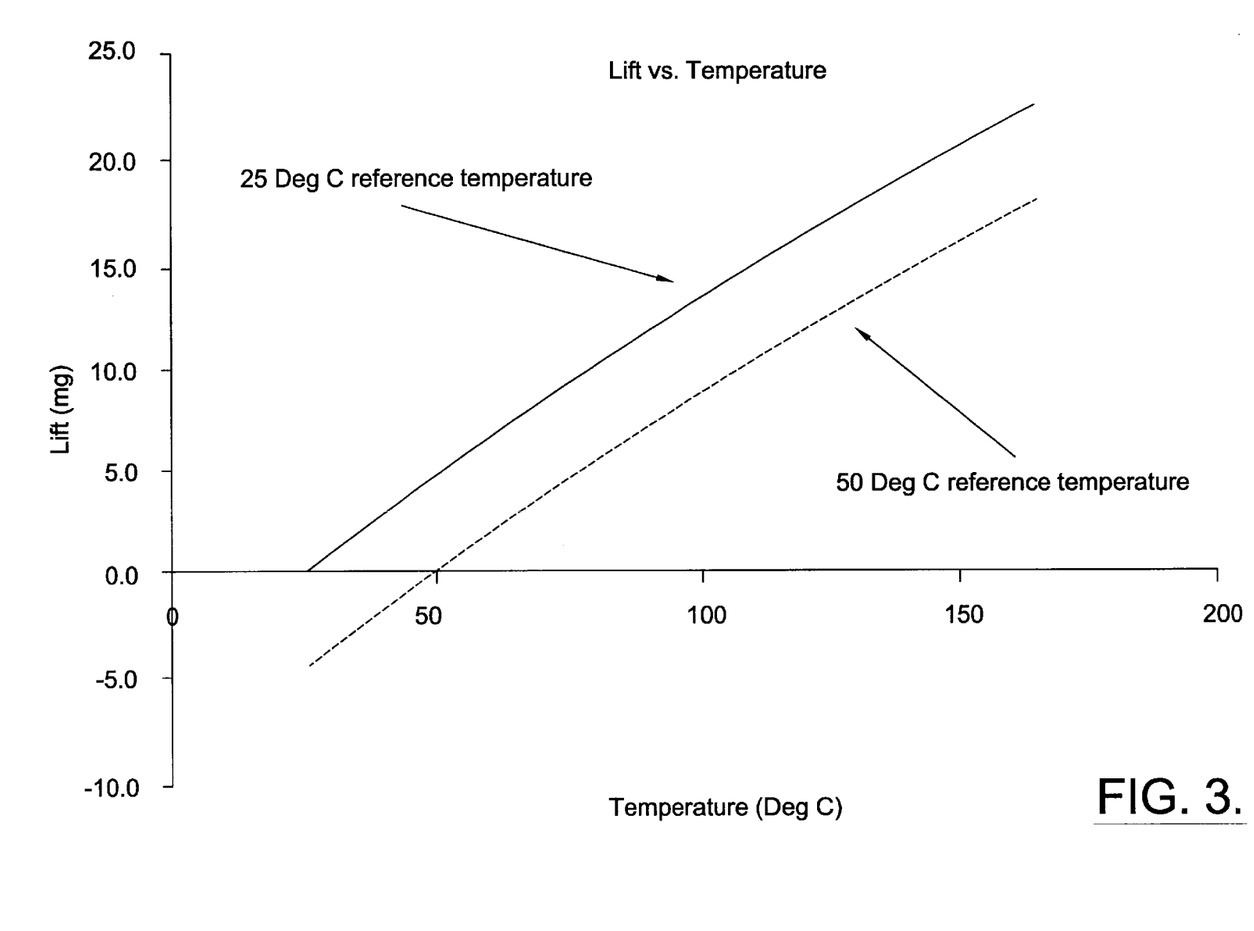
FIG. 3 depicts the buoyancy effect for a standard 98-cm² sample pad based on the surface temperature of a sample pad surrounded by ambient air at either 25° C. or 50° C.
Figure 4:
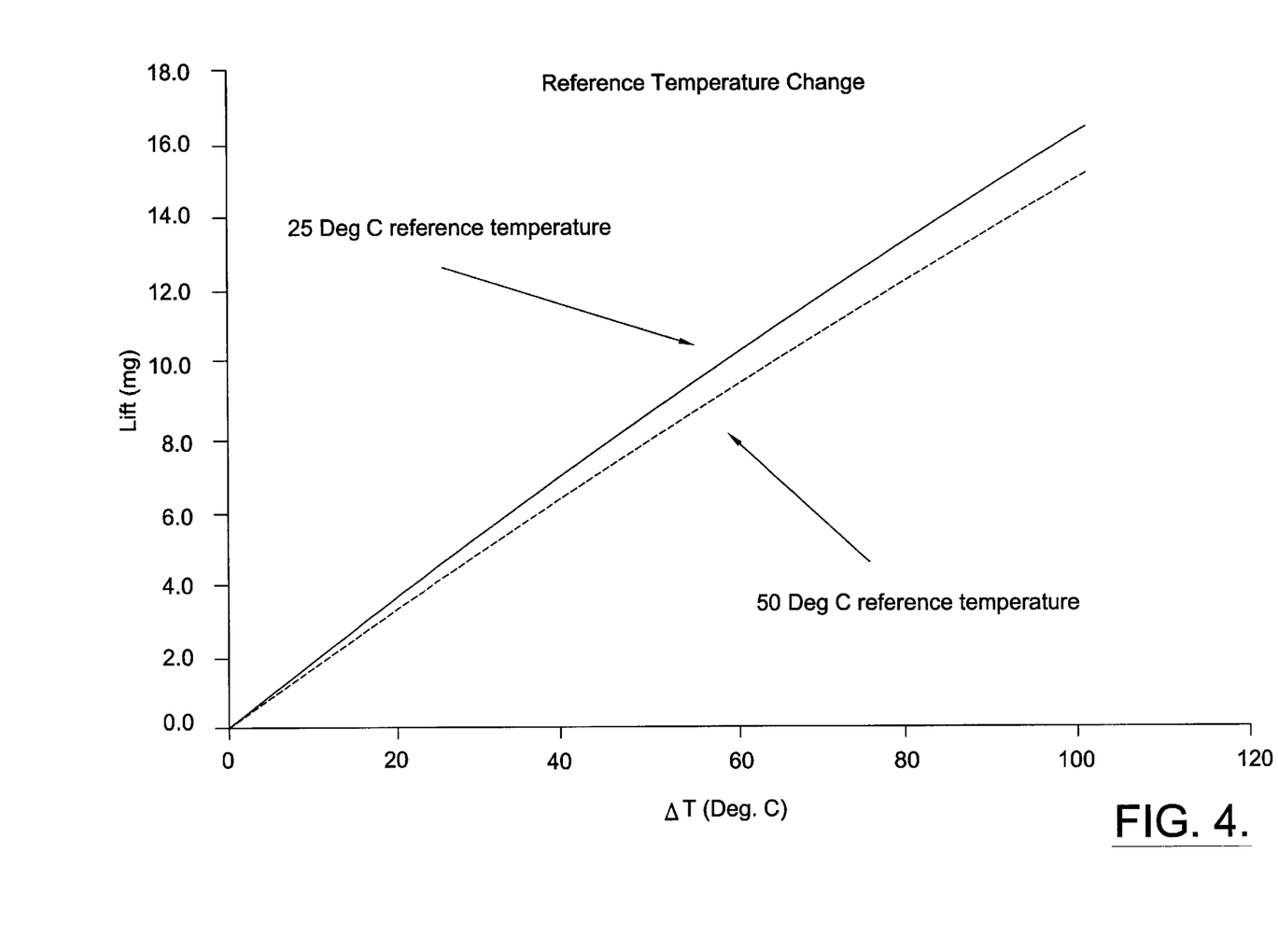
FIG. 4 depicts the buoyancy effect for a standard 98-cm² sample pad based on the difference between the surface temperature of a sample pad and the ambient air temperature surrounding the sample pad, wherein the ambient air temperature is either 25° C. or 50° C.

As will be understood by those having ordinary skill in the art, a warmer ambient air temperature reduces the buoyancy of the sample pad. This is true not only in absolute sense, as it is illustrated in FIG. 3, but also in a relative sense, as it is illustrated in FIG. 4. Both FIGS. 3 and 4 illustrate the data presented in Examples 1 and 2.

Finally, Example 3 also discloses calculated buoyancy lift as a result of a temperature variance between the upper surface of CEM Corporation's standard 98 cm² sample pad (3.85"×4.0") and the ambient air otherwise surrounding the sample pad (i.e., $F_\infty - F_f$). Table 3, however, examines pressure effects when the ambient air is maintained at 25° C., but the air pressure is varied from a standard pressure (1013 millibars) to a slightly reduced pressure of (960 millibars).

EXAMPLE 3

| $T_s$ (°C.) | ΔT (°C.) | Film Layer Density (1013 millibars) | Lift (mg) $(F_\infty - F_f)$ | Film Layer Density (960 millibars) | Lift (mg) $(F_\infty - F_f)$ | Δ |
|---|---|---|---|---|---|---|
| 25 | 0 | 1.183 | 0.0 | 1.122 | 0.0 | 0% |
| 30 | 5 | 1.174 | 1.0 | 1.112 | 0.9 | 5% |
| 35 | 10 | 1.164 | 1.9 | 1.103 | 1.8 | 10% |
| 40 | 15 | 1.154 | 2.8 | 1.094 | 2.7 | 15% |
| 45 | 20 | 1.145 | 3.8 | 1.085 | 3.6 | 20% |
| 50 | 25 | 1.136 | 4.7 | 1.076 | 4.4 | 24% |
| 55 | 30 | 1.127 | 5.6 | 1.068 | 5.3 | 29% |
| 60 | 35 | 1.118 | 6.4 | 1.059 | 6.1 | 34% |
| 65 | 40 | 1.109 | 7.3 | 1.051 | 6.9 | 38% |
| 70 | 45 | 1.100 | 8.1 | 1.043 | 7.7 | 43% |
| 75 | 50 | 1.092 | 9.0 | 1.035 | 8.5 | 47% |
| 80 | 55 | 1.083 | 9.8 | 1.027 | 9.3 | 51% |
| 85 | 60 | 1.075 | 10.6 | 1.019 | 10.1 | 56% |
| 90 | 65 | 1.067 | 11.4 | 1.011 | 10.8 | 60% |
| 95 | 70 | 1.059 | 12.2 | 1.004 | 11.6 | 64% |
| 100 | 75 | 1.051 | 13.0 | 0.996 | 12.3 | 68% |
| 105 | 80 | 1.043 | 13.7 | 0.989 | 13.0 | 72% |
| 110 | 85 | 1.036 | 14.5 | 0.982 | 13.7 | 76% |
| 115 | 90 | 1.028 | 15.2 | 0.974 | 14.4 | 80% |
| 120 | 95 | 1.021 | 15.9 | 0.967 | 15.1 | 83% |
| 125 | 100 | 1.013 | 16.7 | 0.960 | 15.8 | 87% |
| 130 | 105 | 1.006 | 17.4 | 0.954 | 16.5 | 91% |
| 135 | 110 | 0.999 | 18.1 | 0.947 | 17.1 | 95% |
| 140 | 115 | 0.992 | 18.8 | 0.940 | 17.8 | 98% |
| 145 | 120 | 0.985 | 19.4 | 0.934 | 18.4 | 102% |
| 150 | 125 | 0.978 | 20.1 | 0.927 | 19.1 | 105% |
| 155 | 130 | 0.972 | 20.8 | 0.921 | 19.7 | 109% |
| 160 | 135 | 0.965 | 21.4 | 0.914 | 20.3 | 112% |
| 165 | 140 | 0.958 | 22.1 | 0.908 | 20.9 | 115% |
| 170 | 145 | 0.952 | 22.7 | 0.902 | 21.5 | 119% |
| 175 | 150 | 0.946 | 23.3 | 0.896 | 22.1 | 122% |

Figure 5:
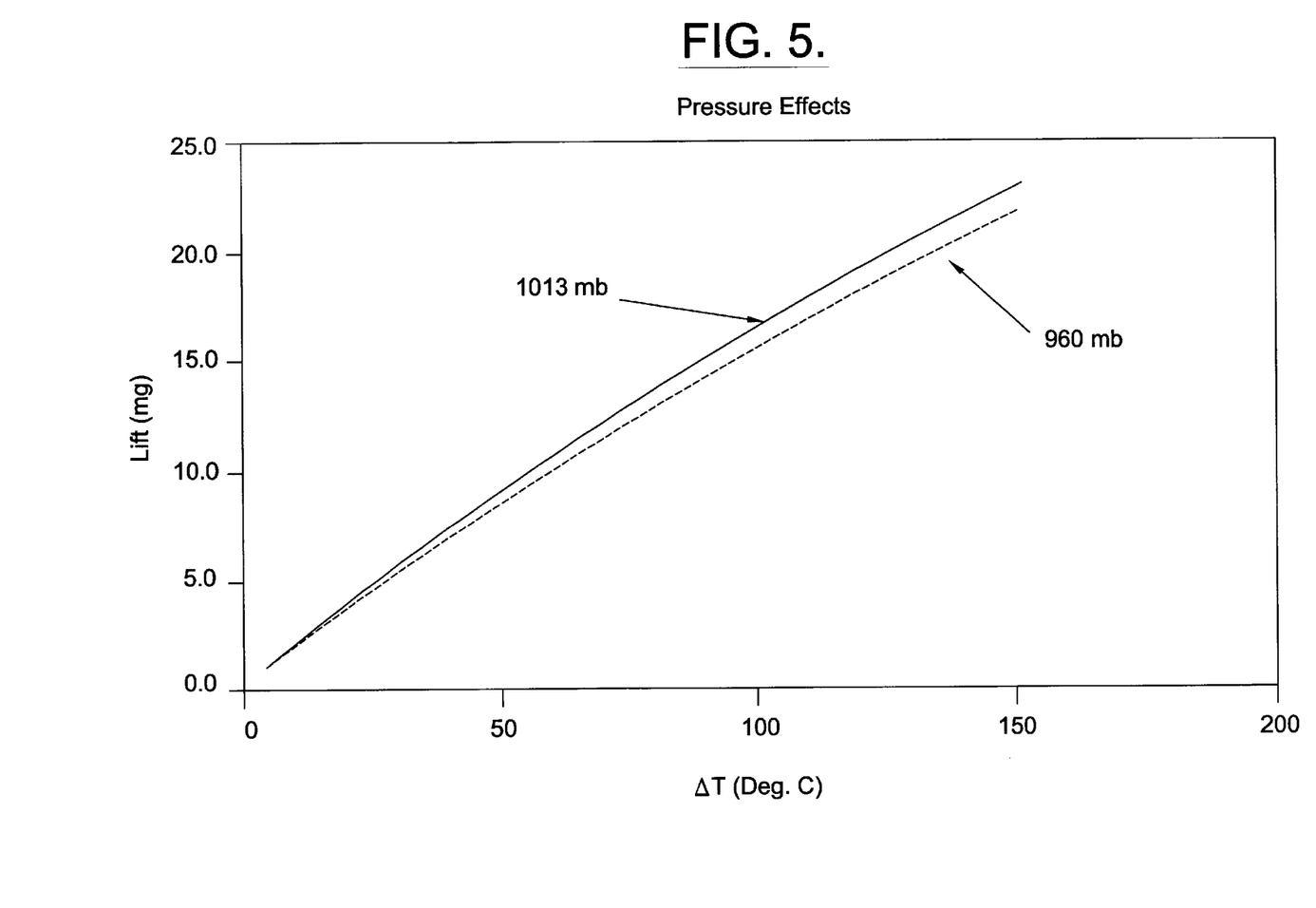
FIG. 5 depicts the buoyancy effect for a standard 98-cm² sample pad based on the difference between the surface temperature of a sample pad and the ambient air temperature (25° C.) surrounding the sample pad, wherein the ambient air pressure is either 1013 millibars or 950 millibars.

In this regard, FIG. 5 illustrates the relative effect of ambient air pressure on buoyancy lift as a function of temperature differential (i.e., $T_s - T_\infty$) by graphically illustrating the data from Example 3. As will be understood by those having ordinary skill the art, assuming a constant temperature differential, lower ambient air pressure will reduce calculated buoyancy lift as compared to a higher ambient air pressure.

The objectives described herein are further enhanced by incorporating the elements disclosed by the co-pending and commonly-assigned applications Ser. No. 09/398,129 (MICROWAVE VOLATILES ANALYZER WITH HIGH EFFICIENCY CAVITY) and Ser. No. 09/397,825 (Microwave Apparatus and Method for Achieving Accurate Weight Measurements), which are hereby incorporated by reference.

In the drawing and the specification, typical embodiments of the invention have been disclosed. Specific terms have been used only in a generic and descriptive sense, and not for purposes of limitation. The scope of the invention is set forth in the following claims.

That which is claimed is:

1. A method of achieving an accurate weight by accounting for buoyancy effects, the method comprising:
   measuring an apparent weight of a substance;
   concurrently measuring a surface temperature of the substance;
   concurrently measuring an ambient air temperature surrounding the substance;
   predicting buoyancy forces acting upon the substance based on the surface temperature of the substance and the ambient air temperature surrounding the substance; and
   determining a true weight of the substance by correcting the apparent weight of the substance by the predicted buoyancy forces acting upon the substance.

2. A method of achieving an accurate sample weight according to claim 1, wherein the step of measuring an apparent weight of a substance comprises measuring an apparent weight of a substance using an analytical balance.

3. A method of achieving an accurate sample weight according to claim 1, wherein the step of concurrently measuring a surface temperature of the substance comprises concurrently measuring a surface temperature of the substance using infrared radiation.

4. A method of achieving an accurate sample weight according to claim 1, wherein the step of concurrently measuring an ambient air temperature surrounding the substance comprises concurrently measuring an ambient air temperature of a microwave cavity.

5. A method of achieving an accurate sample weight according to claim 4, wherein the step of concurrently measuring an ambient air temperature of a microwave cavity comprises predicting an ambient air temperature of a microwave cavity based on the measured temperature of a heatable cavity floor underlying the substance.

6. A method of achieving an accurate sample weight according to claim 1, wherein the step of predicting buoyancy forces acting upon the substance comprises calculating the buoyancy forces as a function of the surface area of the substance, the surface temperature of the substance, and the ambient air temperature surrounding the substance.

7. A method of achieving an accurate sample weight according to claim 6, wherein the step of calculating the buoyancy forces as a function of the surface area of the substance, the surface temperature of the substance, and the ambient air temperature surrounding the substance comprises calculating buoyancy forces from the following equation:

Buoyant Lift (mg)=

$$\frac{p \cdot A}{R} \cdot \left[ \frac{1}{T_\infty} - \frac{2}{(T_\infty - T_s)} \right]$$

wherein,
p=barometric pressure, (N/m$^2$),
A=projected surface area of the substance (cm$^2$),
R=gas constant for air (287.1 J/(kg°K)),
$T_\infty$=absolute ambient air temperature (°K), and
$T_s$=absolute surface temperature of the substance (°K).

8. A method of achieving an accurate sample weight according to claim 1, further comprising the step of applying microwave energy to the substance.

9. A method of achieving an accurate weight by accounting for buoyancy effects, the method comprising:
  measuring an apparent weight of a substance using an analytical balance;
  concurrently measuring a surface temperature of the substance using infrared radiation;
  predicting an ambient air temperature of a microwave cavity based on the measured temperature of a heatable cavity floor underlying the substance;
  calculating the buoyancy forces as a function of the surface area of the substance, the surface temperature of the substance, and the ambient air temperature surrounding the substance; and
  determining a true weight of the substance by correcting the apparent weight of the substance by the calculated buoyancy forces acting upon the substance.

10. A method of achieving a true sample weight from an analytical balance by correcting for buoyancy forces, the method comprising:
  measuring with an analytical balance an apparent weight of a sample pad positioned within a microwave cavity while concurrently measuring an initial surface temperature of the sample pad and an initial ambient air temperature of the microwave cavity;
  predicting buoyancy forces acting upon the sample pad based on the initial surface temperature of the sample pad and the initial ambient air temperature of the microwave cavity;
  determining a true weight of the sample pad by correcting the initial apparent weight of the sample pad by the predicted buoyancy forces acting upon the sample pad;
  thereafter placing a material sample on the sample pad;
  measuring with the analytical balance an apparent combined weight of the sample pad and the material sample while concurrently measuring a subsequent surface temperature of the sample pad and a subsequent ambient air temperature of the microwave cavity;
  predicting buoyancy forces acting upon the sample pad and the material sample based on the subsequent surface temperature of the sample pad and the subsequent ambient air temperature of the microwave cavity;
  determining a true combined weight of the sample pad and the material sample by correcting the apparent combined weight of the sample pad and the material sample by the predicted buoyancy forces acting upon the sample pad and the material sample; and
  calculating a true weight of the material sample before drying by subtracting the true weight of the sample pad from the true combined weight of the sample pad and the material sample.

11. A method according to claim 10, further comprising the following subsequent steps:
  applying heat energy to the material sample until the material sample is dry;
  measuring with the analytical balance an apparent combined weight of the sample pad and the dried material sample while concurrently measuring a final surface temperature of the sample pad and a final ambient air temperature of the microwave cavity;
  predicting buoyancy forces acting upon the sample pad and the dried material sample based on the final surface temperature of the sample pad and the final ambient air temperature of the microwave cavity;
  determining a true combined weight of the sample pad and the dried material sample by correcting the apparent combined weight of the sample pad and the dried material sample by the predicted buoyancy forces acting upon the sample pad and the dried material sample; and
  calculating a true weight of the dried material sample by subtracting the true weight of the sample pad from the true weight of the sample pad and the dried material sample.

12. A method according to claim 11, wherein the step of applying heat energy to the material sample comprises applying microwave radiation to the material sample until the material sample is dry.

13. A method according to claim 11, further comprising the step of calculating the solids fraction of the material sample by dividing the true weight of the dried material sample by the true weight of the material sample before drying.

14. A method of accurately determining the solid fraction of a material sample in a microwave apparatus by correcting weight measurements to account for buoyancy effects caused by air gradients within the microwave apparatus, comprising:
  determining a true weight of a material sample positioned within a microwave cavity before drying by correcting a pre-drying measured weight of the material sample to account for buoyancy effects caused by a temperature variance between a sample pad upon which the material sample rests and the ambient air within the microwave cavity;
  drying the material sample by introducing microwave energy into the microwave cavity;
  determining a true weight of the a material sample after drying by correcting a post-drying measured weight of the material sample to account for buoyancy effects caused by a temperature variance between the sample pad upon which the material sample rests and the ambient air within the microwave cavity; and thereafter calculating the solids fraction of the material sample by dividing the true weight of the material sample after drying by the true weight of the material sample before drying.

15. A method according to claim 14, wherein the step of determining a true weight of a material sample before drying comprises:

measuring with an analytical balance an apparent weight of a sample pad positioned within a microwave cavity while concurrently measuring an initial surface temperature of the sample pad and an initial ambient air temperature of the microwave cavity;

predicting buoyancy forces acting upon the sample pad based on the initial surface temperature of the sample pad and the initial ambient air temperature of the microwave cavity;

determining a true weight of the sample pad by correcting the initial apparent weight of the sample pad by the predicted buoyancy forces acting upon the sample pad;

thereafter placing a material sample on the sample pad;

measuring with the analytical balance an apparent combined weight of the sample pad and the material sample while concurrently measuring a subsequent surface temperature of the sample pad and a subsequent ambient air temperature of the microwave cavity;

predicting buoyancy forces acting upon the sample pad and the material sample based on the subsequent surface temperature of the sample pad and the subsequent ambient air temperature of the microwave cavity;

determining a true combined weight of the sample pad and the material sample by correcting the apparent combined weight of the sample pad and the material sample by the predicted buoyancy forces acting upon the sample pad and the material sample; and calculating a true weight of the material sample before drying by subtracting the true weight of the sample pad from the true combined weight of the sample pad and the material sample.

16. A method according to claim 14, wherein the step of determining a true weight of a material sample after drying comprises:

measuring with the analytical balance an apparent combined weight of the sample pad and the dried material sample while concurrently measuring a final surface temperature of the sample pad and a final ambient air temperature of the microwave cavity;

predicting buoyancy forces acting upon the sample pad and the dried material sample based on the final surface temperature of the sample pad and the final ambient air temperature of the microwave cavity;

determining a true combined weight of the sample pad and the dried material sample by correcting the apparent combined weight of the sample pad and the dried material sample by the predicted buoyancy forces acting upon the sample pad and the dried material sample; and calculating a true weight of the dried material sample by subtracting the true weight of the sample pad from the true weight of the sample pad and the dried material sample.

* * * * *